United States Patent
Levin et al.

(10) Patent No.: US 11,887,114 B2
(45) Date of Patent: Jan. 30, 2024

(54) SYSTEMS AND METHODS FOR PULSING CONTENT

(71) Applicant: NBCUniversal Media, LLC, New York, NY (US)

(72) Inventors: Michael S. Levin, Jersey City, NJ (US); Christopher Lynn, Brooklyn, NY (US); Alexandra Paige, New York, NY (US); Beth Kramer, Woodside, NY (US); Natasha Thandi, Elmont, NY (US); Carlos Costa, Centennial, CO (US); David Hollo, Arvada, CO (US); Karthik Rengasamy, Seacaucus, NJ (US); Adrian Ritchie, Englewood, CO (US); Rebecca Mason, Merrick, NY (US)

(73) Assignee: NBCUniversal Media, LLC, New York, NY (US)

( * ) Notice: Subject to any disclaimer, the term of this patent is extended or adjusted under 35 U.S.C. 154(b) by 387 days.

(21) Appl. No.: 16/951,847

(22) Filed: Nov. 18, 2020

(65) Prior Publication Data

US 2021/0073708 A1    Mar. 11, 2021

Related U.S. Application Data

(60) Provisional application No. 63/004,832, filed on Apr. 3, 2020.

(51) Int. Cl.
G06Q 20/38     (2012.01)
G06Q 20/32     (2012.01)
(Continued)

(52) U.S. Cl.
CPC ......... *G06Q 20/385* (2013.01); *G06F 3/0482* (2013.01); *G06F 16/7867* (2019.01);
(Continued)

(58) Field of Classification Search
None
See application file for complete search history.

(56) References Cited

U.S. PATENT DOCUMENTS 7,266,726 B1 *  9/2007  Ladd ...................... H04L 41/50
                                                714/E11.147
8,214,518 B1 *  7/2012  Bertz ...................... H04L 65/70
                                                709/219
(Continued)

FOREIGN PATENT DOCUMENTS

KR        20160049543 A      5/2016

OTHER PUBLICATIONS

Video Ad Serving Template (VAST) Version 4.2 t IAB Technology Laboratory (2019) https://iabtechlab.com/vast (Year: 2019).*
(Continued)

*Primary Examiner* — William L Bashore
*Assistant Examiner* — Nathan K Shrewsbury
(74) *Attorney, Agent, or Firm* — Fletcher Yoder, P.C.

(57) ABSTRACT

Systems and methods for pulsing and controlling quality of content are provided. An automated QC system that automatically monitors (e.g., pulses) content for any changes by third-party servers and subsequently deactivates problematic content may improve user experience in relation to viewing content and enhance revenue gains for the content provider. For example, a confidence tool may identify problematic changes to the content via a pulsing mechanism, in which content is identified for deactivation until changes to the content meet the specification of the content presentation services. Active (e.g., live) or in-flight (e.g., scheduled to be live) content may continue being pulsed for any modifications unless it has been deactivated

20 Claims, 6 Drawing Sheets

(51) Int. Cl.
 *G06Q 20/34* (2012.01)
 *G06F 16/78* (2019.01)
 *G06F 3/0482* (2013.01)
 *G06Q 10/0639* (2023.01)
 *G06Q 30/0251* (2023.01)
 *H04N 21/458* (2011.01)
 *H04N 21/81* (2011.01)

(52) U.S. Cl.
 CPC ... *G06Q 10/06395* (2013.01); *G06Q 20/3226* (2013.01); *G06Q 20/354* (2013.01); *G06Q 20/3829* (2013.01); *G06Q 30/0264* (2013.01); *H04N 21/458* (2013.01); *H04N 21/812* (2013.01)

(56) References Cited

U.S. PATENT DOCUMENTS

| | | | | |
|---|---|---|---|---|
| 8,533,755 | B1* | 9/2013 | Sherwin | H04N 21/23424 725/35 |
| 8,718,445 | B1* | 5/2014 | Berger | G11B 27/10 386/249 |
| 9,009,834 | B1* | 4/2015 | Ren | G06F 21/6209 709/224 |
| 9,135,345 | B1 | 9/2015 | Larson | |
| 9,137,417 | B2* | 9/2015 | Macciola | G06T 5/001 |
| 9,553,918 | B1* | 1/2017 | Manion | G06F 16/40 |
| 10,694,226 | B1* | 6/2020 | Demsey | G06Q 30/0275 |
| 11,122,309 | B2* | 9/2021 | Levin | H04N 21/812 |
| 11,509,950 | B2* | 11/2022 | Levin | H04N 21/812 |
| 2003/0167234 | A1* | 9/2003 | Bodmer | G06Q 20/382 705/51 |
| 2004/0093253 | A1* | 5/2004 | Lijima | G06Q 30/0264 348/E7.063 |
| 2006/0149623 | A1* | 7/2006 | Badros | G06Q 30/02 705/14.66 |
| 2008/0195664 | A1* | 8/2008 | Maharajh | G06Q 30/0244 |
| 2008/0263673 | A1* | 10/2008 | Brun | G06Q 30/0256 705/14.54 |
| 2009/0030788 | A1* | 1/2009 | Boudah | G09F 15/00 705/14.71 |
| 2010/0042351 | A1* | 2/2010 | Covey | G01N 35/00712 702/108 |
| 2010/0113065 | A1* | 5/2010 | Narayan | H04L 67/306 455/456.3 |
| 2010/0305988 | A1* | 12/2010 | Agarwal | G06Q 10/06395 705/7.41 |
| 2011/0119125 | A1* | 5/2011 | Javangula | G06Q 30/0251 705/14.43 |
| 2012/0158954 | A1* | 6/2012 | Heffernan | G06Q 30/0241 709/224 |
| 2013/0132854 | A1* | 5/2013 | Raleigh | G06F 3/0482 715/738 |
| 2013/0212619 | A1* | 8/2013 | Yerli | G06Q 30/0241 725/32 |
| 2013/0317808 | A1* | 11/2013 | Kruel | H04L 51/52 704/9 |
| 2014/0164093 | A1* | 6/2014 | Libman | G06Q 30/0277 705/14.39 |
| 2014/0229271 | A1* | 8/2014 | Clapp | G06Q 30/0245 705/14.44 |
| 2014/0282634 | A1* | 9/2014 | Phan | G06Q 30/0273 725/32 |
| 2014/0355955 | A1* | 12/2014 | Berger | G06Q 30/0267 386/248 |
| 2015/0066630 | A1* | 3/2015 | Ge | G06Q 30/0244 705/14.43 |
| 2015/0120459 | A1* | 4/2015 | Zeigler | H04N 21/812 705/14.61 |
| 2015/0128157 | A1* | 5/2015 | Hardie | H04N 21/4126 725/5 |
| 2015/0128162 | A1 | 5/2015 | Ionescu | |
| 2015/0150046 | A1* | 5/2015 | Maharajh | H04L 65/762 725/34 |
| 2015/0242901 | A1* | 8/2015 | Losey | G11B 27/102 705/14.61 |
| 2015/0325268 | A1* | 11/2015 | Berger | H04N 21/4335 386/248 |
| 2016/0028651 | A1* | 1/2016 | Ramakrishnan | H04L 65/00 709/226 |
| 2016/0162125 | A1* | 6/2016 | Martella | G06F 16/4387 715/716 |
| 2016/0173553 | A1* | 6/2016 | Panje | H04L 65/61 709/219 |
| 2017/0070476 | A1* | 3/2017 | Massoudi | H04L 67/306 |
| 2017/0098252 | A1* | 4/2017 | Box | H04N 21/26241 |
| 2017/0169855 | A1* | 6/2017 | D'Autremont | H04N 21/85406 |
| 2018/0192159 | A1* | 7/2018 | Pope, V | H04N 21/812 |
| 2018/0270534 | A1* | 9/2018 | Badawiyeh | H04N 21/23424 |
| 2018/0376216 | A1* | 12/2018 | Zhou | H04N 21/44016 |
| 2019/0007648 | A1* | 1/2019 | Serrano | H04N 21/41415 |
| 2019/0188095 | A1* | 6/2019 | Shen | G06F 11/2033 |
| 2019/0188753 | A1* | 6/2019 | McConnell | G06Q 30/0277 |
| 2019/0287138 | A1* | 9/2019 | Buchalter | G06Q 30/0275 |
| 2019/0313141 | A1* | 10/2019 | Armstrong | H04N 21/2547 |
| 2020/0124576 | A1* | 4/2020 | Kobold | G01N 30/88 |
| 2020/0133224 | A1* | 4/2020 | Popp | G05B 19/188 |
| 2020/0288214 | A1* | 9/2020 | Castano | H04N 21/812 |
| 2020/0410542 | A1* | 12/2020 | Demsey | G06Q 30/0244 |
| 2021/0073708 | A1* | 3/2021 | Levin | G06Q 20/3829 |
| 2021/0099759 | A1* | 4/2021 | Armstrong | H04N 21/6582 |
| 2021/0204009 | A1* | 7/2021 | Levin | H04N 21/2402 |
| 2021/0314643 | A1* | 10/2021 | Levin | G06F 16/7867 |
| 2021/0319477 | A1* | 10/2021 | Malihy | H04W 4/029 |
| 2022/0092341 | A1* | 3/2022 | Levin | G06V 20/46 |
| 2023/0078516 | A1* | 3/2023 | Levin | H04N 21/812 |

OTHER PUBLICATIONS

European Search Report; EP Application No. EP 20217293.8; dated Jul. 6, 2021.

* cited by examiner

| □ CAMPAIGN ID | CREATIVE NAME | VENDOR | ADVERTISER | VERTICAL | CREATED DATE | CREATED BY | START DATE | LAST SUBMITTED DATE | PULSING STATUS | DEACTIVATED | QC RESULT | CLEARED FOR | PROGRESS |
|---|---|---|---|---|---|---|---|---|---|---|---|---|---|
| 5091667 | VAST_CORP. #1_XYZ_1234_01012050 | XYZ | CORP. #1 | ENTERTAINMENT | 01/01/50 | USER #1 | 01/01/50 | 01/03/50 | ● INELIGIBLE | 2/4 DEACTIVATED | FAIL | NONE | QC SALES OPS REVIEW |
| 5091667 | VAST_CORP. #1_XYZ_1234_01012050 | XYZ | CORP. #1 | ENTERTAINMENT | 01/01/50 | USER #1 | 01/01/50 | 01/03/50 | ○ INELIGIBLE | 1/4 DEACTIVATED | FAIL | NONE | QC SALES OPS REVIEW |
| 5091667 | VAST_CORP. #1_XYZ_1234_01012050 | XYZ | CORP. #1 | ENTERTAINMENT | 01/01/50 | USER #1 | 01/01/50 | 01/03/50 | ● INELIGIBLE | 0/4 DEACTIVATED | FAIL | NONE | QC SALES OPS REVIEW |
| 5091667 | VAST_CORP. #1_XYZ_1234_01012050 | XYZ | CORP. #1 | ENTERTAINMENT | 01/01/50 | USER #1 | 01/01/50 | 01/03/50 | ● INELIGIBLE | 0/3 DEACTIVATED | FAIL | NONE | QC SALES OPS REVIEW |
| 5091667 | VAST_CORP. #1_XYZ_1234_01012050 | XYZ | CORP. #1 | ENTERTAINMENT | 01/01/50 | USER #1 | 01/01/50 | 01/03/50 | ● INELIGIBLE | 2/5 DEACTIVATED | FAIL | NONE | QC SALES OPS REVIEW |
| 5091667 | VAST_CORP. #1_XYZ_1234_01012050 | XYZ | CORP. #1 | ENTERTAINMENT | 01/01/50 | USER #1 | 01/01/50 | 01/03/50 | ○ INELIGIBLE | 1/4 DEACTIVATED | FAIL | NONE | QC SALES OPS REVIEW |
| 5091667 | VAST_CORP. #1_XYZ_1234_01012050 | XYZ | CORP. #1 | ENTERTAINMENT | 01/01/50 | USER #1 | 01/01/50 | 01/03/50 | ○ INELIGIBLE | 1/4 DEACTIVATED | FAIL | NONE | QC SALES OPS REVIEW |
| 5091667 | VAST_CORP. #1_XYZ_1234_01012050 | XYZ | CORP. #1 | ENTERTAINMENT | 01/01/50 | USER #1 | 01/01/50 | 01/03/50 | ○ INELIGIBLE | 3/5 DEACTIVATED | FAIL | NONE | QC SALES OPS REVIEW |
| 5091667 | VAST_CORP. #1_XYZ_1234_01012050 | XYZ | CORP. #1 | ENTERTAINMENT | 01/01/50 | USER #1 | 01/01/50 | 01/03/50 | ○ INELIGIBLE | 1/2 DEACTIVATED | FAIL | NONE | QC SALES OPS REVIEW |

FIG. 7

QC RESULTS

☐ DISPLAY RENDITION SPECS

☐ SHOW ONLY FAILURE

☐ VIEW FULLSCREEN

CAMPAIGN ID 402 — 5088405
CREATIVE NAME 404 — VAST #1
ADVERTISER 406 — CORP. #1
PLACING ID 408 — https://ad.net/ddm/pfadx/n9515.1489339NBCUNIVERSALNBCNEW0/
TAG 410 — B23162608.255070300b;sz-0x0;ord-[timestamp];dc_lat;dc_rdid...
LAST SUBMITTED DATE — 01/01/2020   DEACTIVATED 412

ADVERTISER
PLACING ID         PULSING STATUS - CREATIVE PLACEMENT UPDATE
COPY LATEST SUBMISSION FAILURES

SUBMISSION 1

| QC RESULTS<br>1 CREATIVE ROUND | CREATIVE AD ID<br>450862654 | | |
|---|---|---|---|
| XML | PASS | | |
| MEZZANINE | PASS | | |
| HIGH | PASS | | |
| MEDIUM | PASS | | |
| LOW | FAIL | N/A THESAMPLING GREQUENCY OF 10_SOUECE_65780_231538 MEET SPEC C | |
| | | N/A THESAMPLING GREQUENCY OF 5_SOUECE_65780_231538 IS 44100Hz, SPEC REQUIRES 48000Hz | |

*FIG. 8*

SYSTEMS AND METHODS FOR PULSING CONTENT

CROSS REFERENCE RELATED TO APPLICATIONS

This application claims priority from and the benefit of U.S. Provisional Application Ser. No. 63/004,832, entitled "SYSTEMS AND METHODS FOR PULSING CONTENT," filed Apr. 3, 2020. This U.S. Provisional Application is hereby incorporated by reference in its entirety for all purposes.

BACKGROUND

The present disclosure relates generally to content provision. More particularly, the present disclosure relates to systems and methods for pulsed content review via a confidence tool.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Content providers often use quality control systems to monitor properties of content (e.g., advertisements, commercials) before and after being deployed via content presentation services. Quality control systems may monitor content based on quality requirements and subsequently deactivate problematic content when the problematic content does not meet certain thresholds or requirements of the content presentation services. Unfortunately, content is oftentimes stored at third-party servers (e.g., servers of third party advertisers, third party vendors) and is oftentimes modified without notifying content providers. Monitoring content for any changes that do not meet quality requirements via manual intervention is not efficient and may result in a loss of time, resources, and revenue for content providers. Therefore, a quality control system that controls quality of content by pulsing content and deactivating problematic content may be useful to content providers and may improve user experience. As used herein, pulsing content involves continuously or periodically monitoring content for any changes by third-party servers. In particular, by deactivating problematic content using the quality control system, revenue of content providers is protected from losses in monetization due to problematic content interfering with content streams. Systems and methods for controlling quality of content is provided in detail in U.S. patent application Ser. No. 16/951,752, entitled "SYSTEMS AND METHODS FOR CONTROLLING QUALITY OF CONTENT," filed Nov. 18, 2020, which is herein incorporated by reference in its entirety.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a tangible, non-transitory, machine-readable medium, which includes machine readable instructions, is provided. When executed by one or more processors of a machine, the machine-readable instructions may cause the machine to identify one or more pulsing-eligible content tags that include data indicating content to be presented via a content presentation service through scheduling by a content provider service; obtain one or more testing parameters associated with presentation parameters of the content presentation service; at periodic intervals, pulse the one or more pulsing-eligible content tags, by identifying any changes to one or more features applicable to the one or more testing parameters that have been made to the one or more pulsing-eligible content tags; and based upon the changes, identify, as quality control (QC) fail content tags, any of the one or more pulsing-eligible content tags that do not meet at least a portion of the one or more testing parameters, are associated with content that does not meet at least a portion of the one or more testing parameters, or both. In response to identifying the QC fail content tags, the machine-readable instructions may cause the machine to provide an indication of the QC fail content tags, content associated with the QC fail content tags, or both along with the one or more testing parameters that were not met by the QC fail content tags, the content associated with the QC fail content tags, or both in a graphical user interface (GUI); a request to deactivate the QC fail content tags, the content associated with the QC fail content tags, or both; or both.

In a further embodiment, a method for analyzing a tag is provided. A processor may identify one or more pulsing-eligible content tags that include data indicating content to be presented via a content presentation service through scheduling by a content provider service. The processor may obtain one or more testing parameters associated with presentation parameters of the content presentation service; at periodic intervals, pulse the one or more pulsing-eligible content tags, by identifying any changes to one or more features applicable to the one or more testing parameters that have been made to the one or more pulsing-eligible content tags; and based upon the changes, identify, as QC fail content tags, any of the one or more pulsing-eligible content tags that do not meet at least a portion of the one or more testing parameters, are associated with content that does not meet at least a portion of the one or more testing parameters, or both. In response to identifying the QC fail content tags, the processor may provide an indication of the QC fail content tags, content associated with the QC fail content tags, or both along with the one or more testing parameters that were not met by the QC fail content tags, the content associated with the QC fail content tags, or both in a GUI; a request to deactivate the QC fail content tags, the content associated with the QC fail content tags, or both; or both.

In an additional embodiment, a confidence tool may include a memory and one or more processors. The one or more processors may identify one or more pulsing-eligible content tags that include data indicating content to be presented via a content presentation service through scheduling by a content provider service. The one or more processors may obtain one or more testing parameters associated with presentation parameters of the content presentation service; at periodic intervals, pulse the one or more pulsing-eligible content tags, by identifying any changes to one or more features applicable to the one or more testing parameters that have been made to the one or more pulsing-eligible content tags; and based upon the changes, identify, as QC fail content tags, any of the one or more pulsing-eligible content tags that do not meet at least a portion of the one or more testing parameters, are associated with content that does not meet at least a portion of the one or more testing parameters, or both. In response to identifying the QC fail content tags, the one or more processors may provide an indication of the QC fail content tags, content associated with the QC fail content tags, or both along with the one or more testing parameters that were not met by the QC fail content tags, the content associated with the QC fail content tags, or both in a GUI; a request to deactivate the QC fail content tags, the content associated with the QC fail content tags, or both; or both.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. It should be noted that the term "multimedia" and "media" may be used interchangeably herein.

As discussed in greater detail below, the present embodiments described herein improve efficiencies in monitoring quality of content (e.g., advertisements, commercial notices, marketing content, or another suitable media content). Content may also be referred to as a creative. Before content is displayed via content presentation services, the content undergoes a quality control process to ensure that quality requirements are met. However, even after content that is deemed to have passed a quality control inspection, third-party servers (e.g., third-party advertisers, third party-vendors) may modify or add to a content file (e.g., video ad serving template (VAST)). A content file may contain one or multiple content and may include information about the content regarding bit rate, pixel size, duration, resolution, and so forth. Each content file may be associated with a content tag (e.g., VAST tag).

Conventional quality control systems involve manual intervention to check quality or changes in the content file and tag. Monitoring content in an efficient manner such that any modifications to the content file and tag by third-party servers are accurately detected continues to pose problems despite manual intervention efforts to control quality. For example, third-party servers may change the bit rate, pixels, duration, resolution, and so forth associated with the content without informing the content provider. Content that is altered by third-party servers may no longer meet presentation criteria (e.g., bit rate, pixels, and/or duration criteria) of content presentation services. As such, content presentation services may block playback of such content that does not meet presentation criteria, causing the content provider to lose content presentation or advertising opportunities. As a result, a system that continuously or periodically monitors (e.g., pulses) content for any changes by third-party servers and subsequently deactivates problematic content files may improve user experience in relation to viewing content and enhance revenue gains for the content provider. For example, a confidence tool may identify problematic changes to a content file and tag via a pulsing mechanism, in which the content file and tag are identified for deactivation until changes to the content file and tag meet the specification of the content presentation services.

In some embodiments, the quality control system may also check the subject matter of the content file (e.g., for content appropriateness) via pulsing. For example, certain content may be restricted to content for consumption by minors. The pulsing may check for content appropriateness for minors by identifying objects in frames of the content file, identifying audio and/or subtitles in the content file, or both to identify if objects, audio and/or subtitles classified as inappropriate for minors is in the content file. If the content file is classified as inappropriate for minors, the pulsing may resulting in a failed QC result.

The confidence tool may identify content files that are eligible (e.g., active and in-flight) for pulsing. The confidence tool may improve processing efficiency by performing quality checks only for eligible content files. That is, rather than checking each content file for potential problematic changes, the confidence tool may save processing power, resources, and/or cost by checking only eligible content files. After eligible content files are identified, pulsing eligible content files allows for the content provider to be notified of any changes to the eligible content files and tags and whether the eligible content files and tags are identified for deactivation due to any problematic changes. Active (e.g., live) and in-flight (e.g., scheduled to be live) content files may continue being pulsed for any modifications unless they have been deactivated.

The pulsing mechanism is a component of an automated quality control workflow associated with the confidence tool. This automated quality control workflow includes interaction between a translator cloud (e.g., a user interface), a confidence tool cloud (e.g., decision-making component), a quality control system, a content player, a spot checker tool, and a content provider server. In some embodiments, the confidence tool may operate within the confidence tool cloud. The translator cloud may be a user interface that the content provider (e.g., sales operation team) interacts with. Further, the translator cloud maintains a history of quality control associated with each content tag.

The sales operation team may create a work order by entering metadata (e.g., tag URL, start date, advertiser, etc.) associated with the content tag received by the confidence tool from third-party servers. Creation of the work order may trigger initiation of quality control processes for the content and/or content tags associated with the work order. After the work order has been validated within the confidence tool cloud, the content tag is analyzed for quality via a quality control system or manually checked via a spot checker tool within the confidence tool cloud. For example, the content tag may be analyzed based on rules or testing parameters. The rules or the testing parameters may be configurable based on the type of content associated with the content tag. Content with a higher risk or higher sensitivity (e.g., child protected content) may have different parameters compared to content with lower risk or lower sensitivity (e.g., ad re-runs). In some embodiments, the parameters may be set by requirements or other criteria of the content provider and/or an entity commissioning the content. Examples of such parameters include but are not limited to minimum bit rate, aspect ratio, resolution, frame rate, color space, and/or format specifications. In additional embodiments, the threshold requirements may be based on criteria set by operators of third-party servers who sent the content tags and/or may be set to meet criteria of content presentation services. Flexibility in changing testing parameters for various types of content and content tags allows for a variety of content and content tags to be monitored for quality. Based on the rules or testing parameters, the confidence tool cloud generate a quality control results (e.g., QC fail, QC pass) associated with the content and/or content tags based on whether the content and/or content tags meet the testing parameters.

The QC results (e.g., QC fail, QC pass) associated with the content tag may be displayed by the translator cloud. For example, a message or notification indicating the QC results may be displayed via the translator cloud. As mentioned above, the translator cloud may serve as a user interface that the content provider (e.g., sales operation team) or a user may interact with. Further, in some embodiments, content may be automatically deactivated (e.g., removed from active or in-flight status). The automated quality control workflow enables the sales operation team to check a work order history that includes QC results, deactivated status, pulsing status and so forth near or real-time.

Figure 1:
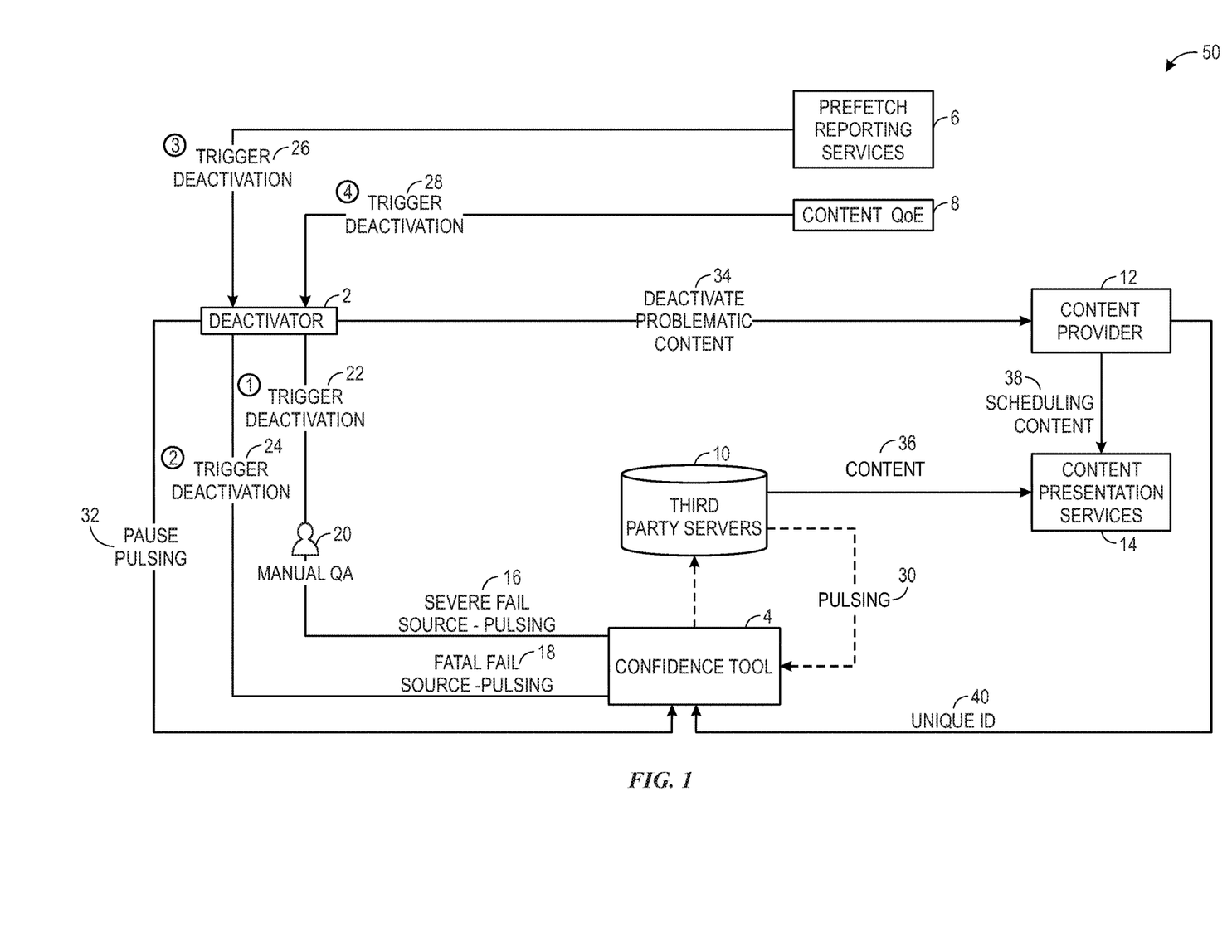
FIG. 1 illustrates a system that deactivates problematic content based on assessing quality of content, in accordance with an embodiment of the present disclosure.

With the preceding in mind, the following figures relate to the system and process of controlling quality of content and subsequently deactivating problematic content. Turning now to FIG. 1, a schematic diagram of an embodiment of a system 50 where embodiments of the present disclosure may operate, is illustrated. For example, the system 50 may include a deactivator component 2 that may be an application program interface (API) designed to automatically deactivate (e.g., remove an active or in-flight status) problematic content and provide a notification (e.g., to a sales team of a content provider 12) by providing useful feedback regarding the problematic content. As used herein, the term API may be defined as a communication protocol between a client and a server or in other words an interface implemented with an application, which allows other applications to communicate with it. An API may include a set of functions, methods, classes, or protocols that an operating system, library, or service provides to support requests made by computer programs. As will be described in more detail below, the deactivator component 2 may trigger deactivations based on an indication of a modification to the content and/or a problem with the content. A confidence tool 4, a prefetch reporting service 6, a content quality of experience (QoE) 8, and/or any combination thereof may generate this indication and request the deactivator component 2 to deactivate the problematic content.

In one embodiment, the deactivator component 2 may receive an indication of problematic changes to content via the confidence tool 4. The confidence tool 4 may receive content from third-party servers 10 (e.g., third party advertisers, third party vendors) that provide content to content presentation services 14. In some instances, as indicated by arrow 36, the content provider 12 may have employed the third-party servers 10 to send content based on the needs and directions of the content provider 12 to the content presentation services 14. As indicated by arrow 38, the content provider 12 controls which content is deployed and/or when the content is deployed to the content presentation services 14. In other words, the content provider 12 regulates scheduling information (e.g., duration of content, tracking beacons associated with the content, media type associated with the content) provided to the content presentation services 14. The third-party servers 10 may be associated with creative or ad agencies that create marketing campaigns, ads, video content, or audio content tailored to meet client needs. In some cases, the content received by the confidence tool 4 from the third-party servers 10 may not be live yet, or in other words has not been presented by content presentation services 14. The confidence tool 4 may serve as a quality control mechanism for such pre-live content (e.g., in-flight content) as well as for content that is already live (e.g., active content). For example, as indicated by arrow 40, the content provider 12 may generate a unique ID based on the content tag being active or scheduled. In turn, the content provider 12 may send the unique ID to the confidence tool 4.

The confidence tool 4 performs pulsing 30, a mechanism that programmatically determines any changes made to receive content. Pulsing 30 may be performed on a continuous or periodic basis (every 1 second, every 1 hour, once a day, twice a day, or any suitable time period). The pulsing 30 operation may enable the confidence tool 4 to determine whether various attributes of the content abide by certain quality criteria (e.g., criteria of the content provider 12 and/or an entity commissioning the creation/editing of the content). Sensitivity associated with content may affect the periodicity of pulsing content. Different content may be pulsed at different frequencies (e.g., based upon characteristics of the content). In one embodiment, content with a higher risk or higher sensitivity compared to a threshold risk or sensitivity level determined by the content provider 12 may be pulsed more frequently than average. For example, content that is associated with (e.g., placed within) sensitive content such as child protected content or high profile content (e.g., live events) may be pulsed at a higher frequency (e.g., five times a day) instead of the average pulsing frequency (e.g., twice a day).

Upon identifying changes in the content and/or content tags during the pulsing, the confidence tool 4 may determine whether content and/or content tags with changes meet criteria of the content provider 12 and/or content presentation services 14. For example, the confidence tool may obtain testing parameters determined by the content provider 12. In some embodiments, the testing parameters may be set based on quality requirements of content presentation services 14. For example, the testing parameters may be associated with bit rate, resolution, pixel size, pixel type, duration of content, video start time, buffering ratio, video start failure, and so forth of content and/or content tags. The confidence tool determines whether changes to features of the particular content and/or content tag satisfy the testing parameters. If the attributes do satisfy the testing parameters, then, a success status (e.g., QC pass) is displayed on the user interface or the translator cloud.

However, if the features do not satisfy the testing parameters, then, a failure status (e.g., QC fail) is displayed on the user interface or the translator cloud. When the quality criteria or testing parameters are not met, the confidence tool 4 may provide an indication to the deactivator component 2, triggering deactivation of the content that does not meet the quality criteria. In some instances, different types of deactivation triggers may be provided to the deactivator component 2. In some embodiments different trigger levels may be implemented to indicate a severity or other characteristics of the problematic content. In the depicted embodiment, the confidence tool 4 may invoke the deactivator component 2 via a first trigger deactivation 22 and/or a second trigger deactivation 24.

The first trigger deactivation 22 is based on problematic content related to a severe fail 16 that, while may still allow playback of the content, may eventually lead to a fatal failure where playback is blocked. Examples of problematic content associated with the severe fail 16 may include severe pixilation issues or spikes in audio. In some instances, problematic content associated with the severe fail 16 may involve manual intervention 20. For instance, if a problematic content may be susceptible to spikes in audio, a person may be assigned to listen to and investigate particular regions of the content for any spikes in audio.

Meanwhile, the second trigger deactivation 24 is based on problematic content related to a fatal fail 18. A fatal fail may be associated with problematic pixel issues associated with a content file that cause the confidence tool 4 to block or send a notification to block the content file associated with the problematic pixel. Examples of the fatal fail 18 may include bit rate issues with the problematic content or broken uniform resource locator (URL) associated with the problematic content. For example, after selecting a URL, information regarding the content is absent due to a domain or vendor issue. As a result, the content may be identified as problematic and be an example of the fatal fail 18. The above-mentioned examples of severe and fatal fails serve as non-limiting examples, and parameters used to identify severe and fatal fails may be configurable. A more in-depth discussion entailing how the confidence tool 4 identifies problematic content based on pulsing will be described below.

Content playback statistics or information may be indicative of problematic content that may need to be deactivated. As such, along with the confidence tool 4, the prefetch reporting service 6 may enable the deactivator component 2 to request deactivation of problematic content. The prefetch reporting service 6 generates or updates a content playback report based on data issued by the content provider 12 on a periodic basis (e.g., daily or any suitable time period). For example, the content playback report may contain data associated with the previous 32 hours or any suitable time period of content playback. The content playback report may include information related to the number of requests associated with the content (e.g., the amount of content expected to play) and the number of refreshes associated with the content (e.g., the amount of content actually played).

Based on the information within the content playback report, the prefetch reporting service 6 may identify problematic content and/or invoke deactivation of problematic content via the deactivator component 2 by providing a third deactivation trigger 26. For example, in some embodiments, if the ratio of an amount of expected playback of a piece of content to be played to an amount of actual playback of the piece of content that is actually played exceeds a prescribed threshold, this may indicate that the piece of content should be deactivated, as there is a discrepancy between the expected and actual playback (e.g., which may be caused by refusal of playback by the content provider 12). The ratio can be inversed as well (amount of content actually played compared to the amount of content expected to be played) in which case the content may be deactivated if the ratio is below a predetermined threshold. Upon identifying problematic content, the content may be deactivated based on the third deactivation trigger 26.

In some embodiments, content quality of experience (QoE), may be used to identify problematic changes to content by determining whether content statistics meet criteria of the content presentation services 14. For example, based upon identifying problematic content via content QoE data, a fourth deactivation trigger 28 may invoke the deactivator component 2. The fourth deactivation trigger 28 may be generated by a content QoE 8. The content statistics (e.g., video start time(s), buffering ratio(s), video start failure(s)) associated the content QoE 8 may help the deactivator component 2 identify and/or request deactivation of the problematic content that has content statistics that do not meet the criteria of the content presentation services 14. The content received by the content QoE 8 as well as by the prefetch reporting service 6 has been live, or in other words has been presented by content presentation services 14. The quality control features of the system 50 described above may not be limited to those discussed herein but rather the confidence tool 4, the prefetch reporting service 6, and the content QoE 8 are examples of monitoring quality of content. As indicated by arrow 34, the deactivator component 2 may request to the content provider 12 to deactivate the problematic content based on the trigger deactivations 22, 24, 26, 28, and any combination thereof.

Once problematic content has been deactivated, it may be unnecessary to check the content for problems again until the problems with the content have been fixed. In one embodiment, if the problematic content has been successfully deactivated, then the deactivator component 2 may request the confidence tool 4 to pause pulsing of the now deactivated problematic content as indicated by arrow 32. For example, the deactivator 2 may receive a deactivation acknowledgement indicating a successful deactivation of problematic content. Upon receiving the acknowledgement, the deactivator 2 may send a pause pulsing command to the confidence tool 4, triggering analysis of the content and/or content tag by the confidence tool 4. Upon passing a pulsing analysis, the confidence tool 4 may request reactivation of the content.

In some embodiments, an indication of an implemented fix to the problematic content may be provided. However, prior to re-activation of the content (e.g., after fixing the problems with the content), the confidence tool 4 may reactivate pulsing. If the fixed content passes the pulsing analysis, then the confidence tool 4 may request reactivation of the fixed content.

As mentioned above, even after content that is deemed to have passed a quality control inspection, third-party servers (e.g., third-party advertisers, third-party vendors) may modify or add to a content file (e.g., VAST). A content file may contain one or multiple contents and may include information about the content regarding bit rate, pixel size, duration, resolution, and so forth. Each content file may be associated with a content tag (e.g., VAST tag). The confidence tool 4 may determine eligibility of content files and tags before pulsing them for any changes. Eligible content files and tags include active (e.g., live) and in-flight (e.g., scheduled to be live) content files and tags. In some embodiments, the confidence tool 4 may analyze quality control information (e.g., a work order) associated with content files and/or content tags to determine whether the content files and/or content tags include and active or scheduled status.

Once the eligible content files and/or content tags are identified, the confidence tool 4 also identifies if new changes to the content file and tag are present after having undergone an initial quality control inspection. If new changes to the content tag and/or file that are different from the initial quality control inspection are identified, the content tag and/or file may be quality control checked again. Based on the pulsing, the confidence tool 4 determines whether the content tag and file are associated with a QC pass fail and determines to deactivate a content tag and file with problematic changes.

Pulsing may be performed on a continuous or periodic basis (every 1 second, every 1 hour, once a day, twice a day or any suitable time period). Based on determining whether various attributes of the content tag abides by certain quality criteria (e.g., criteria of the content provider server and/or an entity commissioning the creation/editing of the content), the confidence tool 4 makes a decision to continue pulsing or deactivate the content tag. When attributes of the content tag do not meet quality criteria, the confidence tool 4 may provide an indication to the deactivator component 2, triggering deactivation of the content tags that do not meet the quality criteria.

Figure 2:
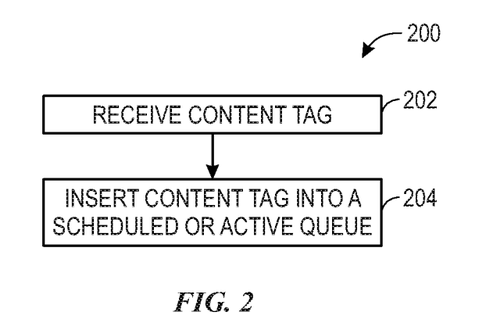
FIG. 2 is a flow chart depicting a process that inserts content tags into an active or scheduled queue, in accordance with an embodiment of the present disclosure.

With the preceding in mind, FIG. 2 depicts a process 200 that inserts a content tag into an active (e.g., live) or scheduled (e.g., in-flight) queue. As mentioned above, pulsing for particular content files and/or content tags may be triggered based upon content files and/or content tags becoming active or scheduled. Pulsing is designed to detect whether a content tag that has previously in-flight passed the QC system still meets the threshold requirements set by the content provider 12 and is appropriate to be played by content presentation services 14. As a result, after the content provider 12 generates a unique ID based on the content tag being active or scheduled, the unique ID is sent to the confidence tool 4. The confidence tool 4 receives the content tag from the third-party server as well as the unique ID from the content provider 12 (block 202). The confidence tool 4 inserts the content tag into an active or scheduled pulsing queue (block 204).

Figure 3:
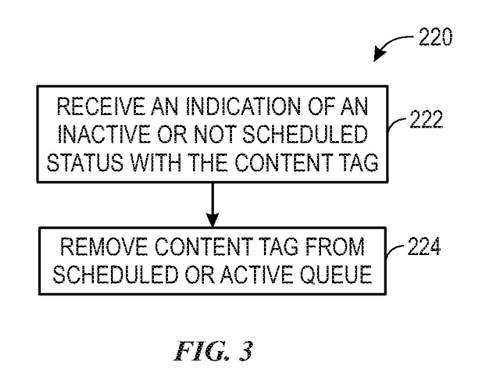
FIG. 3 is a flow chart depicting a process that removes content tags from an active or scheduled queue, in accordance with an embodiment of the present disclosure.

In some embodiments, a flight checker may interface with the confidence tool 4 and the content provider 12 to determine whether the content tag is in-flight or is scheduled. If the content tag is inactive or not scheduled as determined by the flight checker, for example, the confidence tool 4 may remove the content tag from the active or scheduled queue. As such, FIG. 3 depicts process 220 that removes the content tag from the active or scheduled queue. The confidence tool 4 may receive an indication of an inactive or not scheduled status associated with the content tag (block 222) from the flight checker. Further, the confidence tool 4 may receive an indication that the content tag has already been deactivated by the deactivator component 2 (block 224). As a result, the confidence tool 4 may remove the content tag from the active or scheduled queue for pulsing. The removal of the content tag from the active or scheduled queue may result in pulsing to pause for the removed content. This may result in process efficiencies by performing quality checks only for content tags that are active or scheduled. That is, rather than checking each content file for quality issues, the confidence tool may save processing power, resources, and/or cost by checking only active or scheduled content tags.

Further, in some embodiments, pulsing for a particular content tag may expire after a default period of time or a user-specified period of time (e.g., after one year of a content being active or scheduled) to save processing power, resources, and/or cost. Although the confidence tool 4 checks whether a content tag is in flight or scheduled before pulsing, a default pulsing expiration date may serve as a secondary check to ensure that only content that is active or scheduled may be pulsed. For example, given that a campaign for a content ends after one year, pulsing for a content tag associated with the content may automatically expire after one year.

Figure 4:
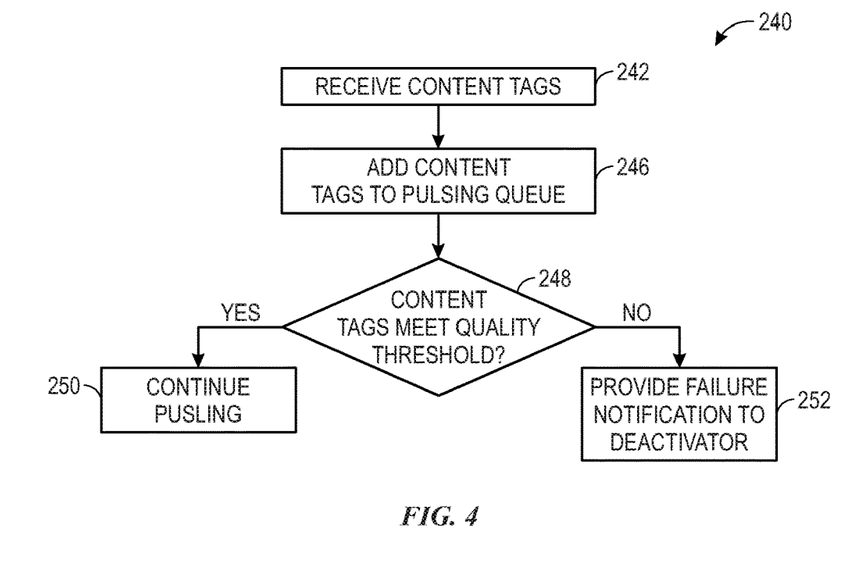
FIG. 4 is a flow chart depicting a process that pulses content to identify problematic content and requests deactivation of content tags associated with such problematic content, in accordance with an embodiment of the present disclosure.

FIG. 4 depicts process 240 that determines whether the content and/or content tag may continue being pulsed and/or may be deactivated. After the confidence tool 4 receives an active or in-flight content tag (block 242) (e.g., from flight checker), the confidence tool 4 adds the content tag to the pulsing queue (block 246). In one embodiment, pulsing may be activated after the confident tool 4 receives the unique ID from the content provider service 142 and/or may continue for content tags already existing in the pulsing queue. Pulsing may operate on a continuous or periodic basis (e.g., twice a day) and may be configurable. In some embodiments, sensitivity associated with content may affect the frequency of pulsing. Content with a higher risk or higher sensitivity compared to a threshold risk or sensitivity level determined by the content provider 12 may be pulsed more frequently than average. For example, content that is associated with (e.g., placed within) sensitive content such as child protected content, high demand content, or high profile content (e.g., live events) may be pulsed at a higher frequency (e.g., five times a day) instead of the average pulsing frequency (e.g., twice a day). On the other hand, content with a lower risk or lower sensitivity compared to a threshold risk or sensitivity level determined by the content provider 12 may be pulsed less frequently (e.g., once a day) than the average pulsing frequency (e.g., twice a day). Additional indicators may be used to indicate the frequency or periodicity of pulsing. For example, high value content (e.g., viewed by a maximum number of viewers, popular, used by more vendors) or content that is prone to frequent edits may be pulsed more frequently than average. On the other hand, if a particular content (e.g., ad re-runs) has been in production for a greater period of time compared to other content, then the particular content may be at a lower risk for improper edits and so forth. Thus, the pulsing frequency for this particular content may be lower than average. Further, when processing power exceeds threshold levels of a processor, certain elements associated with the QC system (e.g., confidence tool workflow) may be ramped down or the usage of certain elements may be reduced to create efficiency of pulsing. For example, a pulsing frequency or periodicity may be reduced to decrease processing power.

The confidence tool determines a status (e.g., inactive, active, and/or in-flight) of content tags, which is used as an eligibility criteria for pulsing. Eligible content tags are added to the pulsing queue. After the eligible content tag has been added to the pulsing queue, the confidence tool 4 pulses the content tag and/or the content associated with the content tag for any changes. If changes are present, then the confidence tool 4 pulses the content tag and/or the content associated with the content tag to determine whether the content tag and/or the content associated with the content tag meets quality thresholds (block 248). A more-in depth discussion about the quality thresholds is provided below. If the content tag does meet the quality threshold, then the confidence tool 4 continues pulsing the content tag (block 250). However, if the content tag does not meet the quality threshold, then the confidence tool 4 may provide a failure notification to the deactivator component 2 (block 252), which in turn trigger deactivation of the content tag via the deactivator 2.

Figure 5:
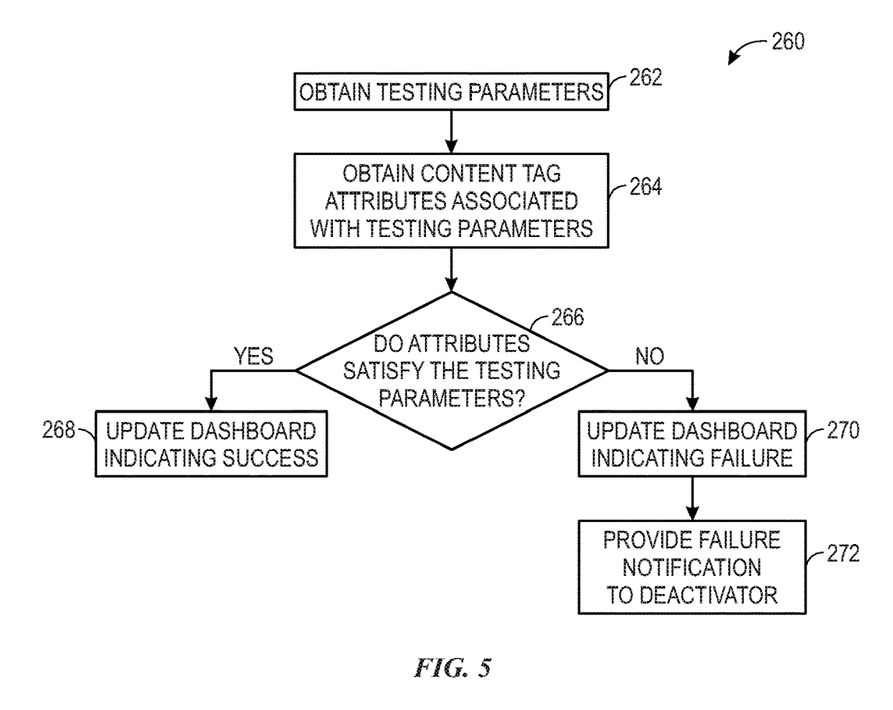
FIG. 5 is a flow chart depicting a process that updates a dashboard (e.g., work order panel, control panel) based on a pulsing content quality decision, in accordance with an embodiment of the present disclosure.

FIG. 5 depicts a process 260 that updates a dashboard or GUI based on a pulsing decision. The pulsing decision is made based on comparing attributes of the content tag to testing parameters. The confidence tool 4 obtains testing parameters (block 262) determined by the content provider 12. In some embodiments, the testing parameters may be set based on quality requirements of content presentation services 14. For example, the testing parameters may be associated with bit rate, resolution, pixel size, duration of content, video start time, buffering ratio, video start failure, and so forth of content tags. Additionally, the confidence tool 4 may receive attributes associated with a particular content tag (block 264). The confidence tool determines whether the attributes of the particular content tag satisfy the testing parameters (block 266). If the attributes do not satisfy the testing parameters, then, a failure status (e.g., QC fail) is set and displayed on the user interface (block 270), and the confidence tool sends a failure notification to the deactivator component 2 (block 272). For example, a duration of a content may be 16 seconds, but the testing parameter associated with duration may be set to 15 seconds. Since an attribute of the content does not satisfy a testing parameter, the content is associated with a QC fail.

However, if the attributes do satisfy the testing parameters, then, a success status (e.g., QC pass) is set and displayed on the user interface (block 268). In some embodiments, multiple attributes can be used to satisfy a single testing parameter. For example, combined attributes such as dimensions of video, aspect ratio, media file type, and bit rate may be used to meet a single testing parameter.

Figure 6:
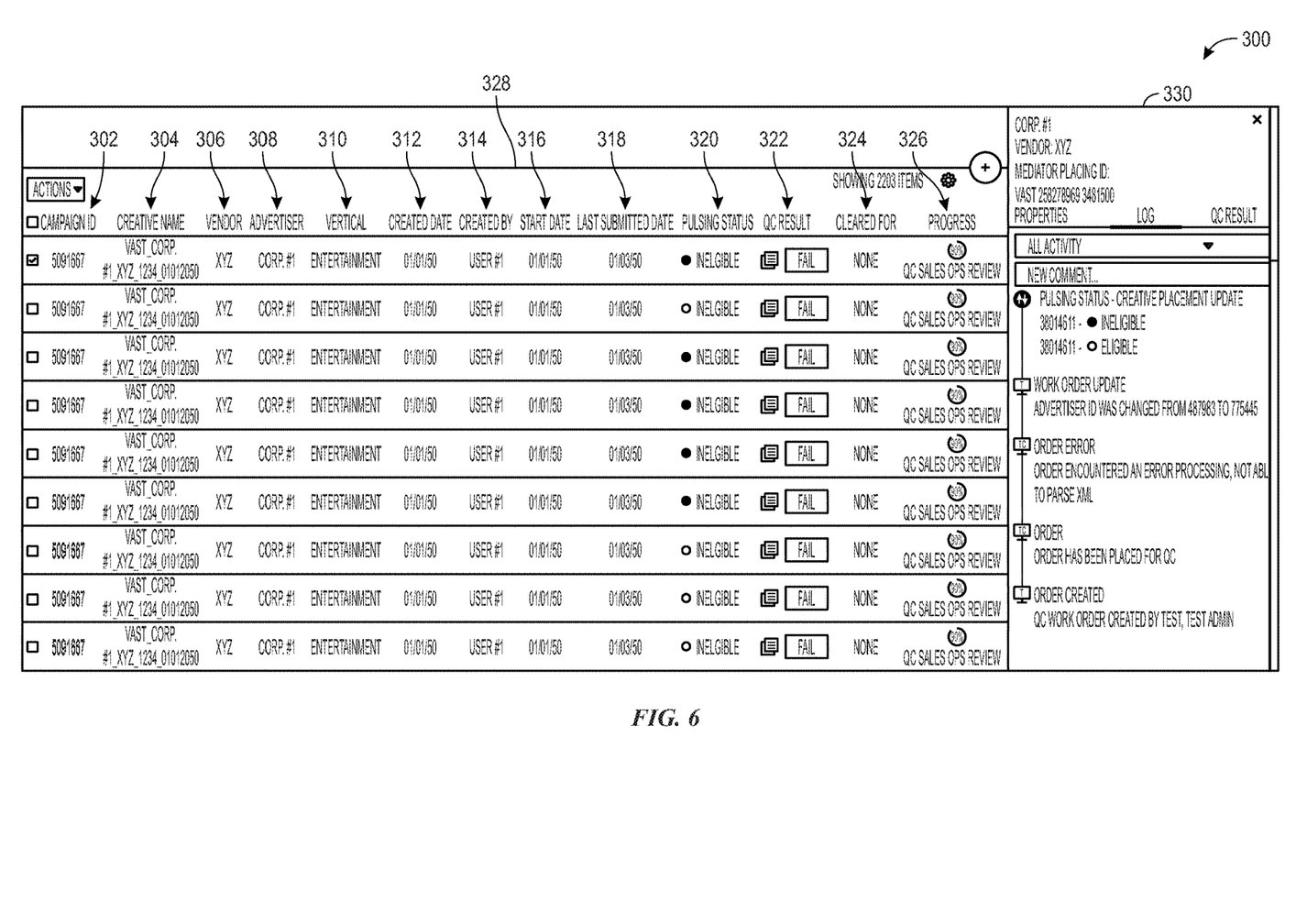
FIG. 6 is a graphical user interface (GUI) that depicts pulsing content quality within the work order panel, in accordance with an embodiment of the present disclosure.

Pulsing status may also be displayed on the user interface. FIG. 6 is a GUI 300 that depicts a work order that has been created by a sales operation team associated with the content provider 12. A work order enables a content tag to undergo the quality control inspection. For example, to initiate the quality control inspection, a sales operation team associated with the content provider 12 may create a work order by entering metadata (e.g., tag URL, start date, advertiser) associated with the content tag received by the confidence tool from third-party servers. A work order panel 328 may include a history of previous work orders. Information related to previous work orders may be categorized based on columns associated with an campaign ID 302, content or creative name 304, vendor 306, advertiser (e.g., content presentation service) 308, vertical 310, date of content creation 312, who created the content 314, start date of content 316, last submitted date of content 318, pulsing status 320, QC results 322, what domains the content is cleared for 324, QC progress 326, and so forth. As used herein, the campaign ID 302 may be associated with a campaign, which is a series of content for a particular theme or marketing platform. If a content tag is used for multiple work orders, the campaign order ID field may be updated to include each relevant campaign ID. Further, the vertical 310 may define the industry (e.g., news, entertainment, online content service) in which a vendor offers content. A domain is unique identifier associated with the vendor 306. It may be appreciated that organizing the information based on the above-described column may help a user easily distinguish particular content and/or content tags, especially when a campaign may be associated with multiple creatives or content.

As mentioned above, pulsing may be performed on active or in-flight content, while not being performed on content that is not active or in-flight. Thus, the pulsing status 320 may be displayed as eligible if the content tag is active and in-flight. Otherwise, the pulsing status 320 may be displayed as ineligible if the content tag has been deactivated (e.g., removed from scheduled presentation by a user) or is inactive (e.g., removed from scheduled presentation by the deactivator 2). Further, selecting a certain work order expands quality control information related to the content tag in a side panel 330. The side panel 330 includes additional information about work order such as user comments, errors in the work order, and so forth.

Figure 7:
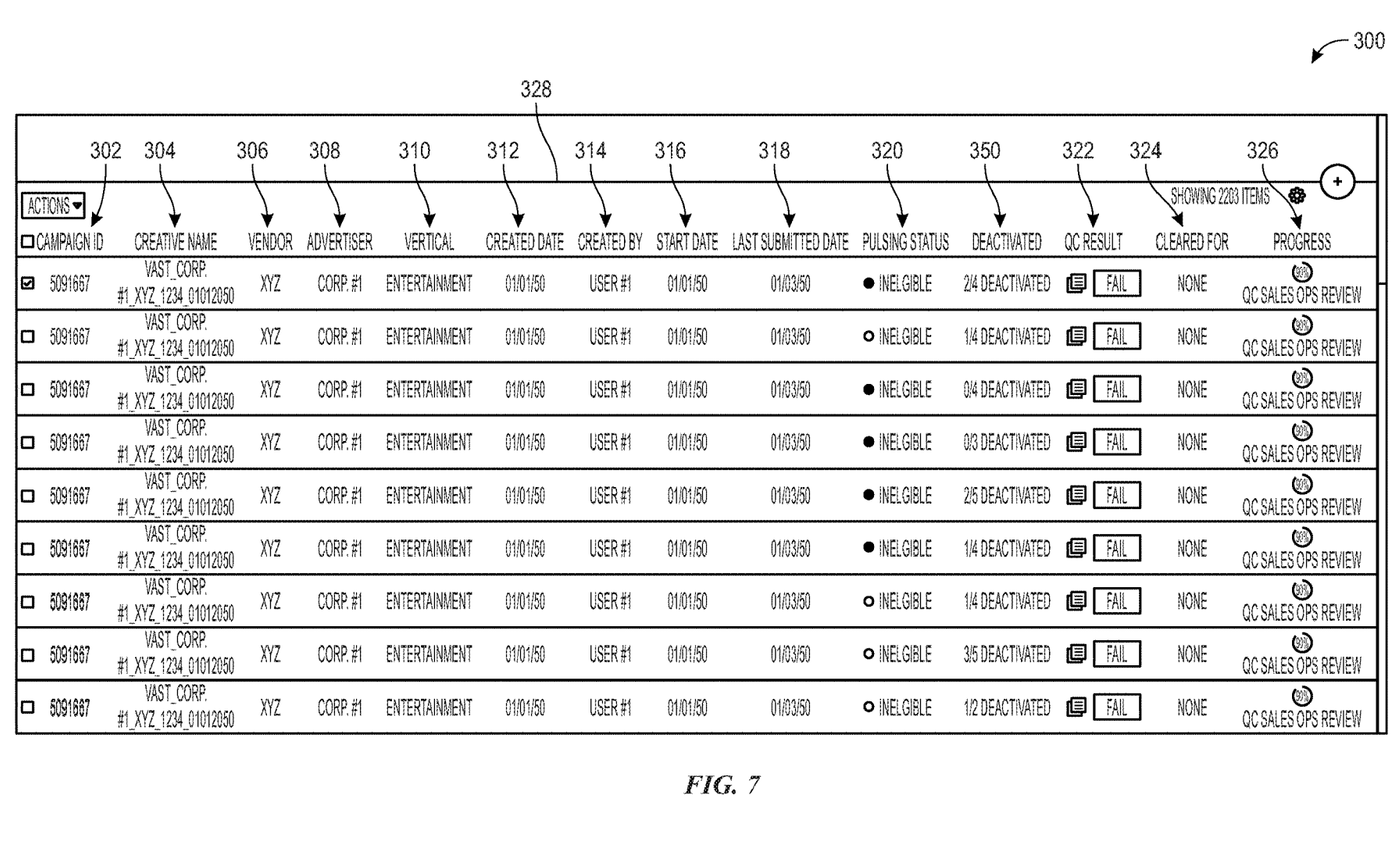
FIG. 7 is a GUI that depicts a deactivation status within the work order panel, in accordance with an embodiment of the present disclosure.

In some embodiments, a status of the content and/or content tag may be provided. For example, FIG. 7 depicts the deactivated status 350 in the GUI 300. This status may be set when a user manually provides an indication that the content and/or content tag should not be scheduled for presentation. In some embodiments, each rendition of a content file (e.g., VAST) associated with the content tag may be deactivated. In some embodiments, multiple versions or renditions of content may be associated with particular file (e.g. VAST). A rendition of a content file may be de defined as a high, medium, or low quality content file. The quality of the content file may be dependent on various features of the content such as video size, video quality, resolution, and so forth. In another embodiment, particular renditions from a single VAST may be deactivated. In additional embodiments, the content tag may be deactivated but eligible for pulsing. In some embodiments, when a work order is associated with multiple placements, two unique IDs may be generated, each corresponding to a particular placement specified by the work order. In certain scenarios, one placement may be eligible (e.g., active and in-flight) while another placement may not be eligible (e.g., not active or not in-flight). The two unique IDs may be generated based on information associated with the content tag from the content provider 12.

Figure 8:
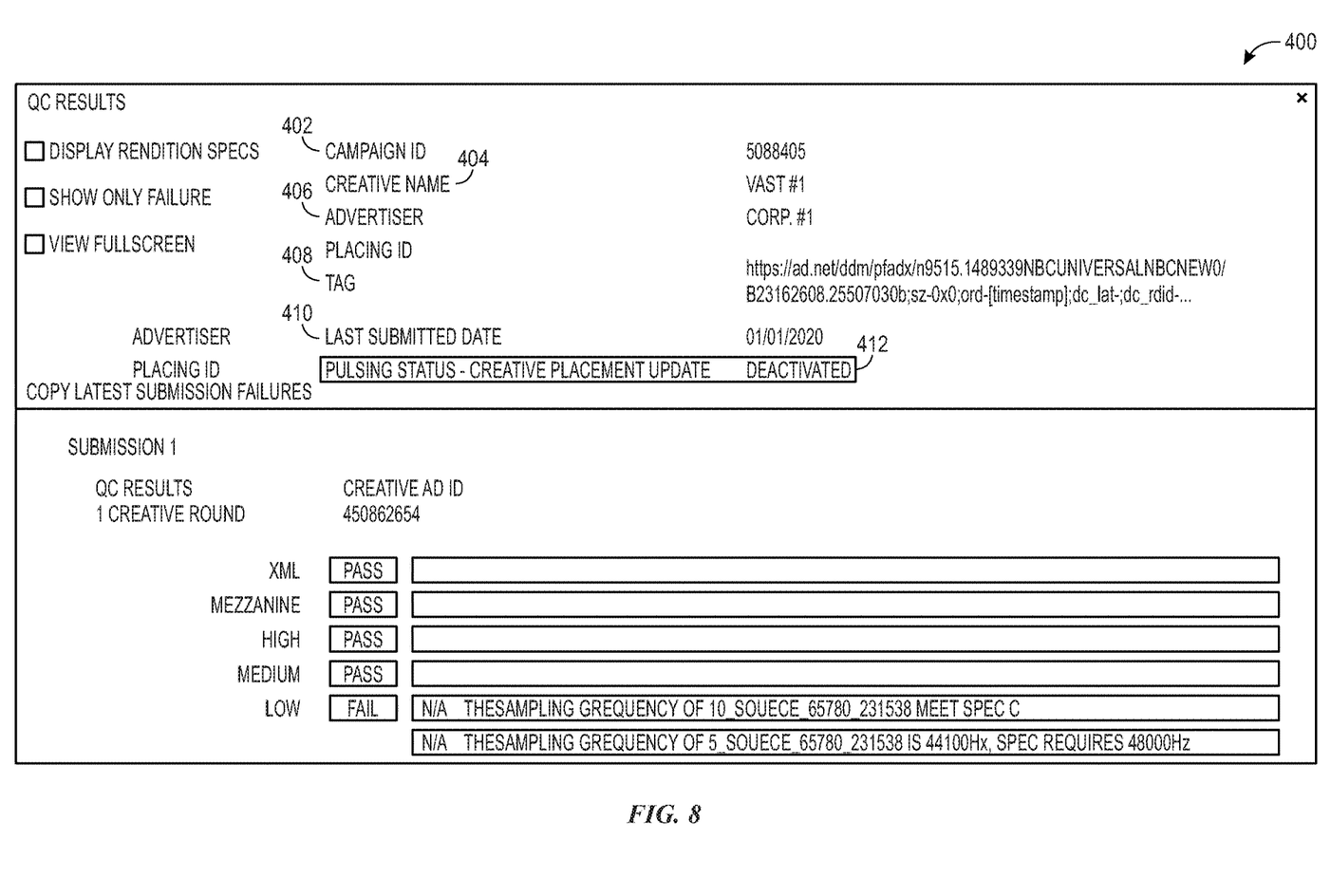
FIG. 8 is a GUI that depicts a detailed view of quality control results with respect to a pulsing status, in accordance with an embodiment of the present disclosure.

It may be desirable to obtain a more detailed understanding of a work order and corresponding status. As such, FIG. 8 depicts a detailed view of the QC results provided by a QC results window GUI 400. The QC results window GUI 400 may be opened for a particular work order. Similar to the work order panel 328 of FIG. 6, QC results may include information such as campaign ID 402, content name 404, advertiser 406, content tag 408, last submitted date 410, and pulsing status 412.

In some embodiments, different levels of validation may be performed. For example, an XML check may identify whether the content tag is properly formed and/or includes expected components. Additionally, another level of validation may look at the attributes of the content itself. In some embodiments, multiple versions of content may be associated with a particular work order. For example, in some embodiments, multiple resolutions of a particular content may be associated with the work order. In such embodiments, the pulsing may not be deactivated for a content and/or content tag if the content and/or content tag passes for at least one of the versions of content. Otherwise, if none of the associated versions pass, the pulsing of the content and/or content tag may be deactivated. Thus, in an embodiment where four versions of content with four different resolutions are associated with a work order (e.g., mezzanine rendition, a high resolution rendition, medium resolution rendition, low resolution rendition). Each of the different resolution levels correspond to particular standards (e.g., resolution, aspect ratio, bandwidth) for playback of content. For example, the mezzanine level corresponds to a high standard quality compared to any of the other resolution levels while the low resolution rendition corresponds to low standard quality compared to any of the other resolution levels.

In this example, an all or nothing approach has been implemented, whereby the pulsing status 412 indicates that the pulsing is deactivated as some of validation levels pass (e.g., mezzanine, high resolution rendition, and medium resolution rendition) but one level (low resolution rendition) fails within the QC process. In a majority approach, the pulsing status 412 would indicate active pulsing as the majority of validation levels pass. In some approaches, if at least one version passes, the pulsing may continue. For example, in a single version approach, the pulsing status 412 would indicate active pulsing as long as one version of the content passes.

Additionally, the QC results provides a reason as to why the content tag failed one of the levels (e.g., low resolution rendition) of the QC process. Overall, GUI 300 allows the sales operation team of the content provider 12 to review the work order history, which includes pulsing status and QC result, efficiently in or near real-time.

Dynamic or periodic quality checking of content and/or content tags using pulsing techniques may help efficiently identify problematic content. For example, only checking active or scheduled content and/or content tags may save processing power, cost, and/or resources. Further, pulsing content and/or content tags periodically or continually for changes even may help inform content providers with any quality control issues in real time or near real-time even when the content providers may not have been notified of changes to the content and/or content tags implemented by third party servers.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A tangible, non-transitory, machine-readable medium, comprising machine-readable instructions that, when executed by one or more processors of a machine, cause the machine to:

identify one or more pulsing-eligible content tags associated with in-flight content configured to be presented via a content presentation service, active content configured to be presented via the content presentation service, or both, in accordance with scheduling by a content provider service;

identify a set of testing parameters associated with presentation parameters of the content presentation service, the presentation parameters comprising parameters for presentation of the in-flight content, the active content, or both, via the content presentation service, the set of testing parameters corresponding to one or more features of the one or more pulsing-eligible content tags;

at periodic intervals, pulse the one or more pulsing-eligible content tags to identify any changes that have been made to the one or more pulsing-eligible content tags;

upon identifying any changes to the one or more pulsing-eligible content tags, evaluate the one or more features of the one or more pulsing-eligible content tags based on the set of testing parameters, and provide a status indication associated with the one or more pulsing-eligible content tags based on the pulsing.

2. The tangible, non-transitory, machine-readable medium of claim 1, comprising machine-readable instructions, that when executed by the one or more processors, cause the machine to:

based upon the pulsing, update a tag status of a content tag of the one or more pulsing-eligible content tags to indicate quality control (QC) fail when the one or more features of the content tag do not meet requirements of at least a portion of the set of testing parameters, update a content status associated with content that does not meet the requirements of at least the portion of the set of testing parameters to indicate QC fail, or both; and in response to the update, provide:

an indication of the content tag associated with QC fail, or the content associated with QC fail, or both along with the portion of the set of testing parameters that were not met via a graphical user interface (GUI);

a request to deactivate the content tag associated with the tag status of QC fail, the content associated with the content tag, or both; or the indication of the content tag associated with QC fail, or the content associated with QC fail, or both along with the portion of the set of testing parameters that were not met via the graphical user interface (GUI) and the request to deactivate the content tag associated with the tag status of QC fail, the content associated with the content tag, or both.

3. The tangible, non-transitory, machine-readable medium of claim 1, comprising machine-readable instructions, that when executed by the one or more processors, cause the machine to:
receive a set of content tags; and
identify a subset of the set of content tags as the one or more pulsing-eligible tags based upon a scheduling status comprising an active scheduling that indicates actively-scheduled content tag or an in-flight scheduling indicating a future-scheduled content tag.

4. The tangible, non-transitory, machine-readable medium of claim 1, wherein the one or more features subject to pulsing comprise a bit rate, a resolution, a pixel size, a type of pixel, a duration of content, or any combination thereof.

5. The tangible, non-transitory, machine-readable medium of claim 2, comprising machine-readable instructions, that when executed by the one or more processors, cause the machine to:
provide the request to deactivate the content tag with the tag status of QC fail, the content associated with the content tag, or both;
in response to the request, receive an indication of a successful deactivation; and
pause pulsing of the content tag, the content associated with the content tag, or both based upon receiving the indication of the successful deactivation.

6. The tangible, non-transitory, machine-readable medium of claim 5, comprising machine-readable instructions, that when executed by the one or more processors, cause the machine to:
reactivate pulsing of the content tag, the content associated with the content tag, or both, in response to receiving an indication that the content tag, the content associated with the content tag, or both are no longer problematic; and
after further pulsing indicating that each of the set of testing parameters are met, reactivate the content tag, the content associated with the content tag, or both.

7. The tangible, non-transitory, machine-readable medium of claim 2, comprising machine-readable instructions, that when executed by the one or more processors, cause the machine to:
upon updating the tag status to QC fail, determine a level of severity associated with the QC fail and provide an indication of the level of severity in the request to deactivate.

8. The tangible, non-transitory, machine-readable medium of claim 1, wherein the one or more pulsing-eligible content tags comprise one or more video ad serving template (VAST) tags.

9. The tangible, non-transitory, machine-readable medium of claim 1, comprising machine-readable instructions, that when executed by the one or more processors, cause the machine to:
identify one or more characteristics of the content to be presented; and
determine a periodicity for pulsing the content to be presented based on the one or more characteristics of the content.

10. A method, comprising:
identify, via a processor, one or more pulsing-eligible content tags associated with in-flight content configured to be presented via a content presentation service, active content configured to be presented via the content presentation service, or both, in accordance with scheduling by a content provider service;
identify, via the processor, a set of testing parameters associated with presentation parameters of the content presentation service, the presentation parameters comprising parameters for presentation of the in-flight content, the active content, or both, via the content presentation service, the set of testing parameters corresponding to one or more features of the one or more pulsing-eligible content tags;
at periodic intervals, pulse, via the processor, the one or more pulsing-eligible content tags to identify any changes that have been made to the one or more pulsing-eligible content tags;
upon identifying any changes to the one or more pulsing-eligible content tags, evaluate the one or more features of the one or more pulsing-eligible content tags based on the set of testing parameters; and
provide, via the processor, a status indication associated with the one or more pulsing-eligible content tags based on the pulsing.

11. The method of claim 10, comprising
based upon the pulsing, update a tag status of a content tag of the one or more pulsing-eligible content tags to indicate quality control (QC) fail when the one or more features of the content tag do not meet requirements of at least a threshold portion of the set of testing parameters, update a content status associated with content that does not meet the requirements of at least the portion of the set of testing parameters to indicate QC fail, or both; and
in response to the update, provide:
an indication of the content tag associated with QC fail, or the content associated with QC fail, or both along with the threshold portion of the set of testing parameters that were not met via a graphical user interface (GUI);
a request to deactivate the content tag associated with the tag status of QC fail, the content associated with the content tag, or both; or
the indication of the content tag associated with QC fail, or the content associated with QC fail, or both along with the threshold portion of the set of testing parameters that were not met via the graphical user interface (GUI) and the request to deactivate the content tag associated with the tag status of QC fail, the content associated with the content tag, or both.

12. The method of claim 11, wherein the threshold portion comprises a majority of the set of testing parameters.

13. The method of claim 11, wherein the threshold portion comprises all of the set of testing parameters.

14. The method of claim 11, wherein the threshold portion comprises a subset of the set of testing parameters associated with at least one version of a plurality of versions of the content associated with the one or more pulsing-eligible content tags.

15. The method of claim 10, comprising performing, via the processor, an XML, check to identify whether the one or more pulsing-eligible content tags includes expected components, formats accepted by the content presentation service, or a combination thereof.

16. A confidence tool, comprising:
a memory; and
one or more processors, configured to:
identify one or more pulsing-eligible content tags associated with in-flight content configured to be presented via a content presentation service, active content configured to be presented via the content presentation service, or both, in accordance with scheduling by a content provider service;

identify a set of testing parameters associated with presentation parameters of the content presentation service, the presentation parameters comprising parameters for presentation of the in-flight content, the active content, or both, via the content presentation service, the set of testing parameters corresponding to one or more features of the one or more pulsing-eligible content tags;

at periodic intervals, pulse the one or more pulsing-eligible content tags to identify any changes that have been made to the one or more pulsing-eligible content tags;

upon identifying any changes to the one or more pulsing-eligible content tags, evaluate the one or more features of the one or more pulsing-eligible content tags based on the set of testing parameters; and provide a status indication associated with the one or more pulsing-eligible content tags based on the pulsing.

17. The confidence tool of claim 16, wherein the one or more processors are configured to:

based upon the pulsing, update a tag status of a content tag of the one or more pulsing-eligible content tags to indicate quality control (QC) fail when the one or more features of the content tag do not meet requirements of at least a portion of the set of testing parameters, update a content status associated with content that does not meet the requirements of at least the portion of the set of testing parameters to indicate QC fail, or both; and in response to the update, provide:

an indication of the content tag associated with QC fail, or the content associated with QC fail, or both along with the portion of the set of testing parameters that were not met via a graphical user interface (GUI);

a request to deactivate the content tag associated with the tag status of QC fail, the content associated with the content tag, or both; or the indication of the content tag associated with QC fail, or the content associated with QC fail, or both along with the portion of the set of testing parameters that were not met via the graphical user interface (GUI) and the request to deactivate the content tag associated with the tag status of QC fail, the content associated with the content tag, or both.

18. The confidence tool of claim 17, wherein the one or more processors are configured to determine a level of severity associated with the content tag associated with QC fail and provide an indication of the level of severity in the request.

19. The confidence tool of claim 18, wherein the level of severity comprises a first failure level, wherein the first failure level is associated with the content tag associated with QC fail having one or more quality issues that will not prevent playback of the content by the content presentation service.

20. The confidence tool of claim 19, wherein the level of severity comprises a second failure level, wherein the second failure level is associated with the content tag associated with QC fail having one or more quality issues that will prevent playback of the content by the content presentation service.

* * * * *